United States Patent Office 3,550,020
Patented Dec. 22, 1970

3,550,020
FUNCTION GENERATOR
Joseph Gill, Bridgeville, and George Rouvalis, Pittsburgh, Pa., assignors to Westinghouse Electric Corporation, Pittsburgh, Pa., a corporation of Pennsylvania
Filed Oct. 17, 1967, Ser. No. 675,876
Int. Cl. H04b 1/04
U.S. Cl. 328—142     11 Claims

ABSTRACT OF THE DISCLOSURE

This function generator provides an output which is piecewise linear approximation to a desired and predetermined output function. A number of operational amplifiers equal to the number of breakpoints desired in the piecewise linear approximation is utilized in the feedback circuit to modify the input-output relationship and thus provide the desired slope for each linear segment. Each operational amplifier is respectively caused to switch through a virtually ideal switching arrangement when the magnitude of the function generator output signal is greater than a respective predetermined breakpoint.

BACKGROUND OF THE INVENTION

The present invention relates, in general, to a controlled output device and, more particularly, to a function generator for providing predetermined output signal characteristics.

A function generator is a device which provides an output equal or approximately equal to some mathematical function. This function may either be linear or nonlinear but in the latter case, a piecewise linear approach is used; that is, the curve to be approximated is broken down into a plurality of linear segments each of which meet another segment at a break point. The accuracy of the approximation is naturally increased by increasing the number of linear segments. However, the limitation upon greater accuracy has traditionally been that greater cost.

For many years various types of function generators have been used to establish a non-linear relationship between variables. These took many forms—including non-linear potentiometers; mechanical, electromechanical curve followers; and mechanical and electrical schemes for approximating curves by a series of straight lines.

The most popular electrical scheme in this last category is the diode function generator whose operation is based on the use of biased diodes connected in a manner to act as switches to modify the feedback of an operational amplifier when the output of the amplifier had reached a preset level.

The difficulty with this scheme in achieving precision and stability is due to the variability of diode impedance with current, temperature, and with respect to other diodes of the same class. The end result is that adjustment and calibration is complicated and there are practical limits to the precision that can be obtained in generating a curve. There is also the problem of maintaining the diodes at a known ambient temperature since the leakage and forward impedance are temperature dependent.

It would, therefore, be advantageous to provide a function generator electronic in nature, based on the idea of approximating a function by a series of straight lines but capable of determining the intersections and slopes of these lines with a high degree of precision. Temperature dependence of this device can be basically several order of magnitude less than that of the diode function generator.

SUMMARY OF THE INVENTION

It is therefore, a general object of the present invention to provide a new and improved function generator.

Another object of the present invention is to provide a new and improved function generator which is substantially independent of temperature and therefore not subject to drift.

A further object of the present invention is to provide a new and improved function generator which is inexpensive to construct yet has extremely high predictability.

A still further object of the present invention is to provide a new and improved function generator which may be adapted to approximate functions of both more or less decreasing slope.

Yet a still further object of the present invention is to provide a new and improved function generator wherein no calibration is required.

In accordance with the principles of the present invention, an input signal is connected to the input of a first operational amplifier having in its feedback path one or more stages of additional operational amplifiers. These additional operational amplifiers become operative and provide a virtually ideal switching arrangement at predetermined output voltage levels of the first operational amplifier to subsequently alter the characteristics of the output signal of the first operational amplifier.

Other objects and advantages of the present invention will become apparent in view of the following description taken in conjunction with the drawings.

DESCRIPTION OF THE INVENTION

Figure 1:
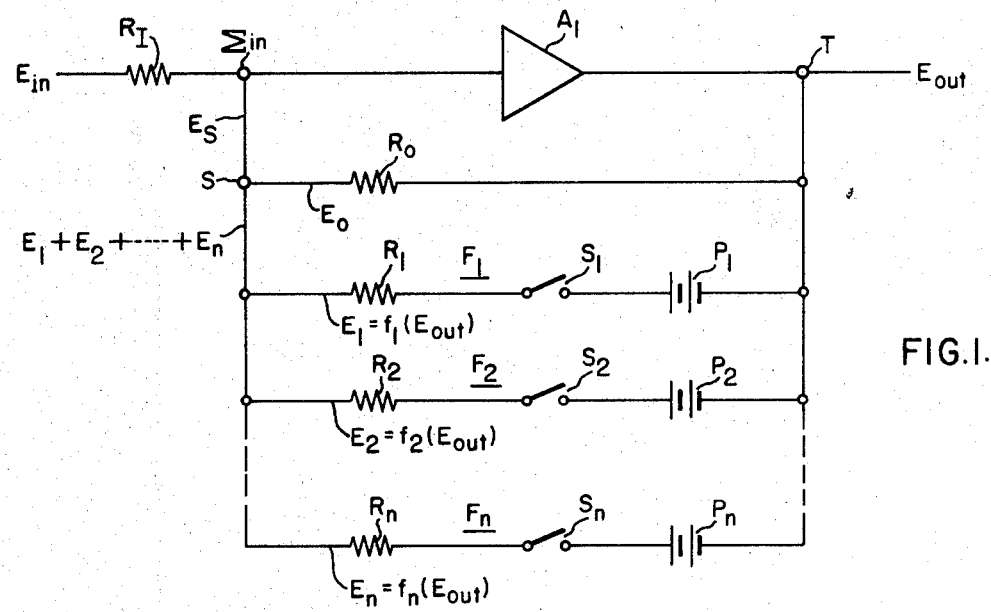
FIG. 1 is a diagrammatic representation of the operating principles of the present invention.

FIG. 1 is illustrative of a function generator based on modifying the input-output relationship based on switches being activated when the output voltage reaches a preset bias. At the time the switch is activated, a voltage exactly equal to the aforementioned bias and a network is inserted by the switch contacts between the output and one of the inputs to the amplifier.

Referring now to FIG. 1, there is shown a conventional and commercially available high gain operational amplifier $A_1$ having an input terminal $\Sigma_{in}$ and an output terminal T. A feedback path is provided from output terminal T to input terminal $\Sigma_{in}$ through a feedback resistor $R_0$. An external input signal $E_{in}$ is provided to the input terminal $\Sigma_{in}$ through an input resistor $R_I$. In parallel with resistor $R_0$ in the feedback path are additional feedback paths $F_1, F_2, \ldots, F_n$. Each of these additional feedback paths provide additional inputs $E_1, E_2, \ldots, E_n$ through respective input resistors $R_1, R_2, \ldots, R_n$ into the input summing terminal $\Sigma_{in}$. It should be noted that if these additional input signals $E_1, E_2, \ldots, E_n$ were externally provided the diagram of FIG. 1 would simply be illustrative of a typical summer circuit having a plurality of input signals which are summed at the input terminal $\Sigma_{in}$ of an operational amplifier $A_1$. However, the distinguishing feature between the typical summer circuit for an operational amplifier and that of FIG. 1 is that not only are the additional input signals $E_1, E_2, \ldots, E_n$ not externally provided, but they are, in fact, some function of the output signal $E_{out}$. Thus, as shown in FIG. 1 each of these additional input signals can be given by the general equation: $E_i = f_i(E_{out})$. But, for these additional input signals to be a function of the output signal $E_{out}$, they must be physically connected to the output terminal T. These connections are provided respectively by switches $S_1, S_2, \ldots, S_n$ which are activated when the generator output signal is equal to a predetermined bias level. The input signal for each feedback path is equal to $(E_{out} - P_1)$ where $P_1, P_2, \ldots, P_n$ are respective bias sources opposite in polarity to that of the output signal $E_{out}$. Since the output signal $E_{out}$ is a function of the magnitude and polarity of the total input signal appearing at input terminal $\Sigma_{in}$, it is possible, by the closing of one or more of the switches $S_1, S_2, \ldots, S_n$ to systematically alter the output signal of the function generator. For example, by closing switch $S_1$ an additional input signal $E_1$ is now directed to the input summing terminal $\Sigma_{in}$ to subsequently alter the input-output relationship of the function generator. Similarly, by closing any of the other switches, additional input signals may be connected which will likewise cause changes in the input-output relationship.

With all the switches open, the gain of the circuit is clearly the ratio of the feedback resistor $R_0$ over the input resistor $R_I$. This gain curve would then continue until a desired break point whereupon switch $S_1$ or any other switch would be closed to develop an additional feedback path which would subsequently change the level of the output signal as a consequence of the change in gain, since the feedback impedance is now that of feedback resistor $R_0$ in parallel with the impedance $R_1$. Thus, the totals gain of the circuit would be a function of the net feedback impedance of the function generator and a change in gain will occur as a consequence of opening or closing one or more of the switches $S_1, S_2, \ldots, S_n$.

In one sense, the circuit may be described as an operational amplifier having an input signal, an output signal and a feedback path wherein the feedback path is made up of a feedback resistor $R_0$ and one or more elements which are in parallel with and cooperate with resistor $R_0$ to provide a predetermined feedback signal. Thus, at terminal S of FIG. 1 there is a total feedback signal $E_S$ comprised of the feedback signal $E_0$ through the feedback path including feedback resistor $R_0$ and one or more additional input signals $E_1 + E_2 + \ldots + E_n$ which may be switched in by the closing of respective switches $S_1, S_2, \ldots, S_n$ to include these parallel elements.

Figure 2:
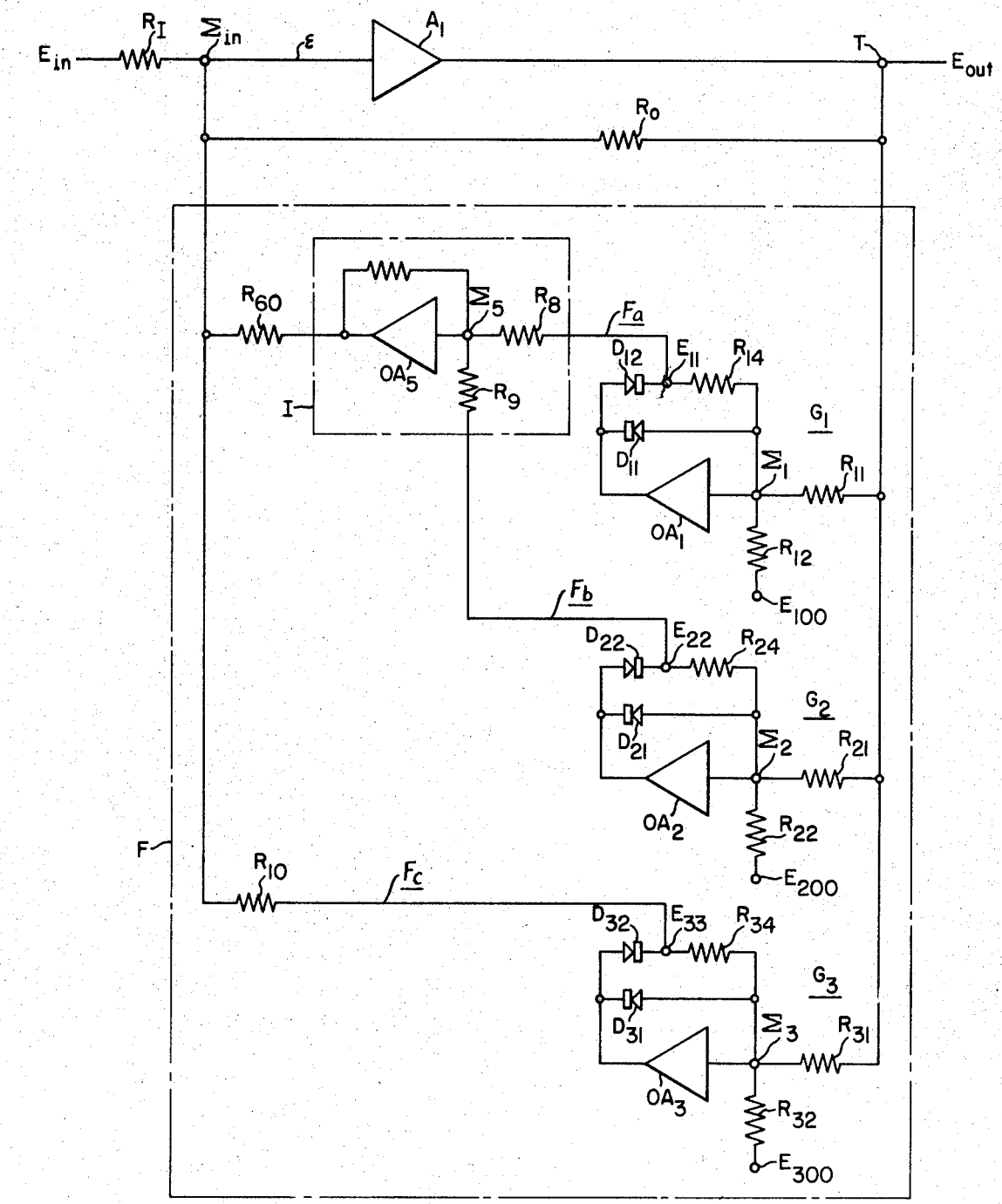
FIG. 2 is a schematic showing of a function generator in accordance with the principles of the present invention.

Referring now to FIG. 2, an example of a function generator embodying the principles of this invention as set forth in FIG. 1 is shown and denoted by numeral 10.

An input signal $E_{in}$ is connected to the summing junction $\Sigma_{in}$ through input resistor $R_I$. Input terminal $\Sigma_{in}$ is the input junction for the operational amplifier $A_1$ which provides an output signal $E_{out}$ at an output terminal T. A feedback network is provided for operational amplifier $A_1$ through feedback resistor $R_0$ which is in parallel with switched feedback network F. The total feedback signal is then connected to the input summing junction $\Sigma_{in}$ for operational amplifier $A_1$.

The feedback network F is comprised of one or more feedback paths, each with an amplifier stage. For purposes of illustration, three feedback paths, $F_a$, $F_b$ and $F_c$, with respective amplifier stages $G_1$, $G_2$, and $G_3$ are shown in FIG. 2. The output signal from stages $G_1$ and $G_2$ are connected to an inverter I which provides a negative feedback signal to the summing junction $\Sigma_{in}$. Thus, negative feedback path $F_a$ includes amplifier stage $G_1$, signal inverter I and a resistor $R_{60}$, while negative feedback path $F_b$ includes amplifier stage $G_2$, signal inverter I and resistor $R_{60}$. On the other hand, the output signal from stage $G_3$ is directly connected to summing junction $\Sigma_{in}$ to provide a positive feedback component. The consequences of various stages of positive and/or negative feedback signals will be further discussed in detail herein.

In the illustration of FIG. 2, the output signal $E_{out}$ is connected to stage $G_1$ through input resistor $R_{11}$ to the input terminal $\Sigma_1$. A source of potential $E_{100}$ also acts as an input signal to input terminal $\Sigma_1$ through input resistor $R_{12}$. The combined input signal at terminal $\Sigma_1$ provides an input signal to the operational amplifier $OA_1$ which has a feedback path having a diode $D_{12}$ and a resistor $R_{14}$ back to the input terminal $\Sigma_1$. The anode electrode of diode $D_{12}$ is connected to the output of operational amplifier $OA_1$ and the cathode electrode is connected to one side of the resistor $R_{14}$. A blocking diode $D_{11}$ is connected with its cathode electrode at the output of operational amplifier $OA_1$ and its anode electrode at the input terminal $\Sigma_1$ to provide a feedback path to negative outputs from operational amplifier $OA_1$. The desired output signal from amplifier stage $G_1$ is the voltage $E_{11}$ which is between diode $D_{12}$ and resistor $R_{14}$. Voltage $E_{11}$ is fed through resistor $R_8$ to inverter input terminal $\Sigma_5$.

Amplifier stage $G_2$ has an input terminal $\Sigma_2$ to which is connected the output signal $E_{out}$ to input resistor $R_{21}$ and a source of potential $E_{200}$ through input resistor $R_{22}$. Input terminal $\Sigma_2$ is connected to operational amplifier $OA_2$ which has in its feedback path a diode $D_{22}$ and a resistor $R_{24}$. Connected across this feedback path is a blocking diode $D_2$, having its cathode electrode connected to the output of operational amplifier $OA_2$ and its anode electrode connected to the input terminal $\Sigma_2$. The function of diodes $D_{21}$ and $D_{22}$ is equivalent to that of diodes $D_{12}$ and $D_{11}$ in stage G. Output from amplifier stage $G_2$ is the output voltage $E_{22}$ which is connected through resistor $R_9$ to input terminal $\Sigma_5$.

The third amplifier stage $G_3$ is similar to the previous stages in that again the output signal $E_{out}$ is connected through an input resistor $R_{31}$ to an input terminal $\Sigma_3$. $E_{300}$, a source of potential is connected through resistor $R_{32}$ to the input terminal $\Sigma_3$ which acts as an input terminal for the operational amplifier $OA_3$. The output of operational amplifier $OA_3$ is connected to the anode side of a diode $D_{32}$. A resistor $R_{34}$ is connected between the cathode side of diode $D_{32}$ and the input terminal $\Sigma_3$. Similarly between the input and output terminals of the operational amplifier $OA_3$ is a blocking diode $D_{31}$ with its anode terminal connected to the input terminal $\Sigma_3$ and its cathode side connected to the output of operational amplifier $OA_3$. As before, the function of diodes $D_{31}$ and $D_{32}$ is equivalent to that of diodes $D_{11}$ and $D_{12}$ in stage $G_1$. The output $E_{33}$ from amplifier stage $G_3$ is taken between the diode $D_{32}$ and the resistor $R_{34}$ through the input resistor $R_{10}$ and to the input summing junction $\Sigma_{in}$.

The inverter stage I includes an operational amplifier $OA_5$ which does nothing more than invert the polarity of the input signal at input junction $\Sigma_5$. This change in polarity is accomplished by using a summing inverting unity gain amplifier. Thus, the output signal at the output side of operational amplifier $OA_5$ is merely the inverse of the sum of $E_{11}$ and $E_{22}$. The output signal of the inverter I is then connected through resistor $R_{60}$ to the input terminal $\Sigma_n$.

As was shown in FIG. 1, the addition of a further input signal or the addition of a feedback element is provided by the closing of a switch $S_1$ as illustrated for feedback element $F_1$. The circuitry for this switching is shown in FIG. 2 through the inclusion of a biasing network. For example, in amplifier stage $G_1$ the externally supplied voltage source $E_{100}$ is purposely of a polarity opposite to that of the output signal $E_{out}$, thereby supplying a bias to the input of amplifier $OA_1$ to provide an operating threshold level which must be overcome by the output signal $E_{out}$ in order to make the diode $D_{12}$ conduct. In the example shown, $E_{100}$ is positive. Thus, for the range of output voltage $E_{out}$ wherein its absolute value is less than that of voltage source $E_{100}$, i.e., when the signal supplied to the input of amplifier $OA_1$ from the output of amplifier $A_1$ is below the operating threshold level provided by the bias voltage $E_{100}$, the net input signal at summing junction $\Sigma_1$ is positive. The operational amplifier $OA_1$ then acts upon this net positive input signal to provide a negative output signal which is unable to pass through the diode $D_{12}$ due to the back biasing of the diode $D_{12}$. In fact, this negative output signal passes through diode $D_{11}$ back to the input terminal $\Sigma_1$ which is essentially held at ground potential. Since there is no current flow through resistor $R_{14}$ the output signal $E_{11}$ is zero and naturally has no affect and provides no input signal to input junction $\Sigma_5$. When the signal supplied to the input of amplifier $OA_1$ from the output of amplifier $A_1$ exceeds and thereby overcomes the operating threshold level provided by the bias voltage $E_{100}$, the net input signal at input terminal $\Sigma_1$ becomes negative and thereby the output signal of operational amplifier $OA_1$ becomes positive, and diode $D_{12}$ becomes conductive to switch on the feedback path $F_a$. Current flow then proceeds from the output of operational amplifier $OA_1$ through the diode $D_{12}$ and the resistor $R_{14}$ to the summing junction $\Sigma_1$. Accordingly, the level of the output signal $E_{11}$ is given by the following formula:

$$E_{11}=\frac{R_{14}}{R_{11}}E_{out}-\frac{R_{14}}{R_{12}}E_{100}=(E_{out}-E_{100})\left(\frac{R_{14}}{R_{12}}\right)$$

$$\text{if } R_{11}=R_{60} \text{ and } |E_{out}| \geq |E_{100}|$$

$$=0 \qquad \text{if } |E_{out}| < |E_{100}|$$

It is apparent, then, that the output signal $E_{11}$ is independent of any voltage drop pertaining to the diode $D_{12}$ and therefore is entirely independent of diode characteristics. A similar operation for amplifier stages $G_2$ and $G_3$ occurs when the level of the output voltage $E_{out}$ becomes equal to or greater than the respective bias voltages $E_{200}$ and $E_{300}$. It should be noted that the inclusion of blocking diode $D_{11}$ is not an indispensible element; rather, it serves to provide a faster response to a net positive input signal at $\Sigma_1$ by keeping operational amplifier $OA_1$ out of saturation for negative output signals.

Figure 3:
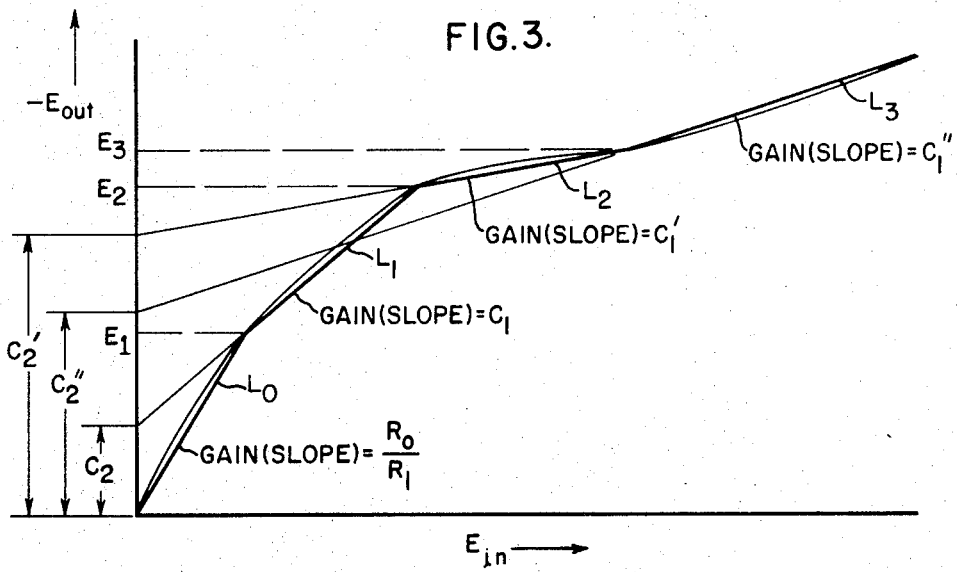
FIG. 3 is a curve chart illustrating the operation of the function generator of FIG. 2.

The curve in FIG. 3 represents the input-vs-output characteristic of the function generator of FIG. 2 are illustrated. There are three break points in the curve which correspond to the three amplifier stages $G_1$, $G_2$ and $G_3$ of FIG. 2. The first linear segment $L_0$ of the curve of FIG. 3 corresponds to the effect of operational amplifier $A_1$ acting alone on the input signal $E_{in}$. So long as the negative of the output signal $E_{out}$ is less than the bias voltages of the amplifier stages $G_1$, $G_2$ and $G_3$, they will be excluded from operation in the circuit 10. Thus, the gain of the line segment $L_0$ is equal to the ratio of resistor $R_0$ to resistor $R_1$.

Once the negative of the output signal $E_{out}$ is equal to the bias voltage $E_{100}$ of stage $G_1$, then an additional input to the summing junction $\Sigma_{in}$ is introduced. The output signal $E_{11}$ from the amplifier stage $G_1$ is inverted in polarity by the inverter I to thus provide an additional input signal which is opposite in polarity to that of the original input signal $E_n$. Thus, the signal at output T terminal is now given by the formula:

$$E_{out}=\frac{E_{in}G_1+E_{100}G_1G_2}{1+G_1G_2} \text{ where } G_1=\frac{R_0}{R_1}; G_2=\frac{R_{14}}{R_{11}}$$

where $R_I = R_{60}$
which simplifies to:

$$E_{out}=C_1E_{in}+C_2 \text{ where } C_1=\frac{G_1}{1+G_1G_2}; C_2=\frac{G_1G_2}{1+G_1G_2}$$

where $C_1$ is a constant equal to the slope of line segment $L_1$ in FIG. 3 and $C_2$ is a constant indicating the Y-intercept if the input voltage $E_{in}$ were equal to zero. Output from the device continues to be along that of line segment $L_1$ until the negative of the output voltage $E_{out}$ becomes equal to or greater than the bias voltage $E_{200}$ of the second amplifier stage $G_2$. By solving for the output voltage $E_{22}$ of the amplifier stage $G_2$ in the previously described manner and by summing the voltages at the input terminal $\Sigma_{in}$ as previously illustrated by Formula 2, yields:

$$E_{out}=C_1'E_{in}+C_2'$$

where $C_1'$ and $C_2'$ are constants and are equal respectively to the slope of the line segment $L_2$ and the Y-intercept of line $L_2$ if it were extrapolated to the Y-axis. Once the negative of the output voltage $E_{out}$ is equal to the bias voltage $E_{300}$ of amplifier stage $G_3$, it, too, becomes active to provide an additional input signal $E_{33}$ to the input terminal $\Sigma_{in}$.

When the negative of the output voltage $E_{out}$ is equal to or greater than the bias voltage $E_{300}$ of amplifier stage $G_3$, it then provides an output signal $E_{33}$ which provides an additional input signal to the input junction $\Sigma_{in}$. The additional input signal $E_{33}$ is of the same polarity as the input signal $E_{in}$ and thereby provides a signal in a positive or additive sense to that of the original input signal $E_{in}$. The advent of a positive input $E_{33}$ also may be considered as reducing the total negative additional input signals which are introduced into the summing junction $\Sigma_{in}$ from the input signals $E_{11}$ and $E_{22}$. As a result the net gain of the system 10 is increased as can be seen from the increased slope of line segment $L_3$. The equation for the line segment $L_3$ may be given by the formula:

$$E_{out}=C_1''E_{in}+C_2''$$

where $C_1''$ is equal to the slope of the line segment $L_3$ and is a constant and where $C_2''$ is equal to the intercept of line segment $L_3$ extrapolated to the Y axis.

In FIG. 2, the respective sources for the bias voltages $E_{100}$, $E_{200}$ and $E_{300}$ are indicated at and symbolized by correspondingly labelled terminals $E_{100}$, $E_{200}$ and $E_{300}$.

Although the present invention has been described with a certain degree of particularity, it should be understood that the present disclosure has been made only by way of example and that numerous changes in the details of construction and the combination and arrangement of parts may be resorted to without departing from the scope and spirit of the present invention. For example, any number of stages utilizing either or both negative and positive feedback may be used to approximate the mathematical function desired. Diode polarities and output polarities can be permutated to take opposite polarity inputs and biases.

We claim:

1. A function generator comprising an operational first amplifier having a first input circuit, a first output circuit and feedback means connected between said input and output circuits, said feedback means comprising a first feedback path that is switched on in response to the output of said amplifier exceeding a predetermined value, said first feedback path comprising:
   (a) a second amplifier having a biased second input circuit, a second output circuit and a negative second feedback path connected between said second output circuit and said second input circuit, said second feedback path including in series a diode, impedance means and a junction therebetween, the diode being connected between said impedance means and said second output circuit,
   (b) first circuit means connecting said first output circuit to said second input circuit, and
   (c) second circuit means connecting said junction to said first input circuit;
      said biased input circuit providing an operating threshold level such that said diode is rendered conductive only when the output of said first amplifier exceeds said predetermined value.

2. The combination as in claim 1 wherein said first input circuit comprises summing means wherein external input signals and signals supplied by said feedback means are summed.

3. The combination as in claim 1 wherein said second input circuit comprises summing means connected to said first output circuit, and wherein there is means for supplying a bias signal to said summing means to provide said operating threshold level.

4. The combination as in claim 1 wherein said first feedback path is a negative feedback path.

5. The combination as in claim 1 wherein said first feedback path is a positive feedback path.

6. The combination as in claim 1 wherein said second circuit means comprises resistance means.

7. The combination as in claim 6 wherein said second circuit means includes signal inverting means in series with said resistance means.

8. A function generator having an input-vs-output characteristic comprising a plurality of differently sloped segments each of which is automatically selectable in response to a different predetermined output magnitude, said generator comprising an operational first amplifier having a first input circuit, a first output circuit and feedback means connected between said input and output circuits, said feedback means comprising a plurality of first feedback paths each of which is switched on in response to the output of said amplifier exceeding a different predetermined value, each first feedback path comprising:
(a) a second amplifier having a biased second input circuit, a second output circuit and a negative second feedback path connected between said second output circuit and said second input circuit, said second feedback path including in series a diode, impedance means and a junction therebetween, the diode being connected between said impedance means and said second output circuit;
(b) first circuit means connecting said first output circuit to said second input circuit; and
(c) second circuit means connecting said junction to said first input circuit;
said biased input circuit of each second amplifier providing an operating threshold level such that the diode associated with that amplifier is rendered conductive only when the output of said first amplifier exceeds a predetermined value that is different for each of said first feedback paths.

9. The combination as in claim 8 wherein at least one of said first feedback paths is a negative feedback path.

10. The combination as in claim 8 wherein at least one of said first feedback paths is a positive feedback path.

11. The combination as in claim 8 wherein at least one of said first feedback paths is a negative feedback path, and at least one of said feedback paths is a positive feedback path.

References Cited

UNITED STATES PATENTS

| | | | |
|---|---|---|---|
| 3,209,266 | 9/1965 | White | 307—229 |
| 3,393,369 | 7/1968 | Embley et al. | 307—229 |

DONALD D. FORRER, Primary Examiner

H. A. DIXON, Assistant Examiner

U.S. Cl. X.R.

307—229